No. 838,558. PATENTED DEC. 18, 1906.
J. H. MAGILL & H. H. POLSON.
NUT LOCK.
APPLICATION FILED AUG. 20, 1906.
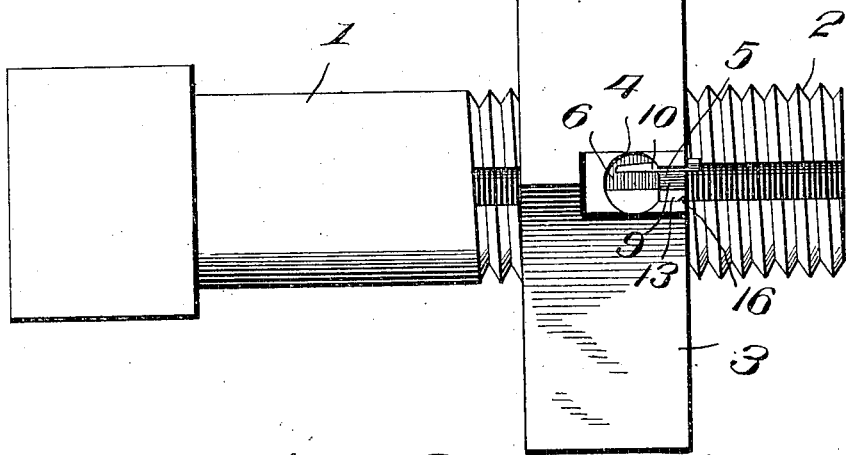
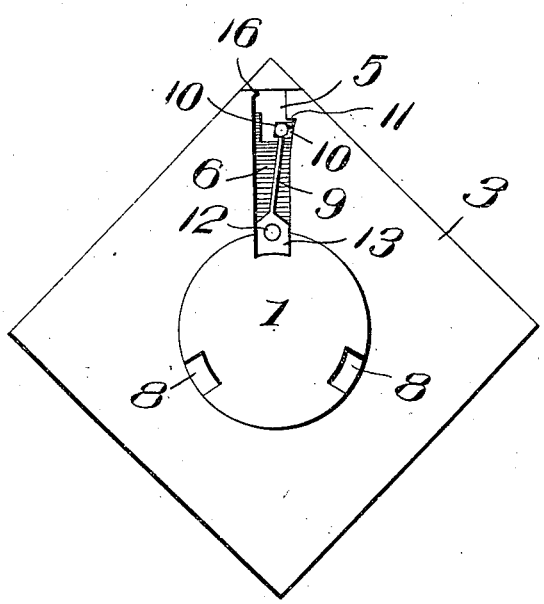
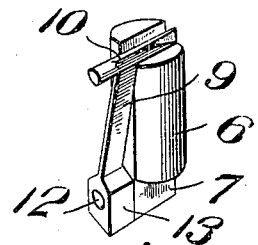
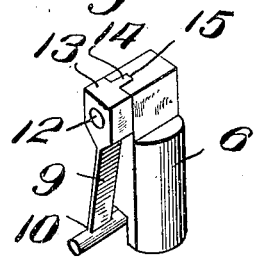
Witnesses
Inventors
John H. Magill,
Henry H. Polson,
By W. J. FitzGerald & Co.
Attorneys

UNITED STATES PATENT OFFICE.

JOHN H. MAGILL AND HENRY H. POLSON, OF REGO, INDIANA.

NUT-LOCK.

No. 838,558.      Specification of Letters Patent.      Patented Dec. 18, 1906.

Application filed August 20, 1906. Serial No. 331,363.

*To all whom it may concern:*

Be it known that we, JOHN H. MAGILL and HENRY H. POLSON, citizens of the United States, residing at Rego, in the county of Orange and State of Indiana, have invented certain new and useful Improvements in Nut-Locks; and we do hereby declare the following to be a full, clear, and exact description of the invention, such as will enable others skilled in the art to which it appertains to make and use the same.

Our invention relates to new and useful improvements in nut-locks; and our object is to provide means for securely locking the nut upon the bolt after the same has been properly adjusted.

A further object is to provide means for holding the locking mechanism into engagement with the bolt; and a still further object is to provide means for locking the mechanism within a suitable bore in the nut.

Further objects and advantages will be hereinafter referred to, and more particularly pointed out in the claims.

In the accompanying drawings, which are made a part of this application, and in which we have shown our preferred form of device, Figure 1 is a plan view of a bolt, showing a nut thereon with our improved locking device secured thereto. Fig. 2 is an end elevation of the bolt and nut, and Figs. 3 and 4 are perspective views of the locking mechanism removed from the nut.

Referring to the drawings, in which similar reference-numerals designate corresponding parts throughout the several views, 1 indicates a bolt, which may be of the usual or any preferred form, having a plurality of threads 2 at one end thereof, with which is adapted to coöperate a threaded nut 3. Directed inwardly from one edge of the nut 3, and preferably at one corner thereof, is a bore 4, said bore having a slot 5 at the upper portion thereof, said slot extending the full length of the bore. Disposed within the bore 4 is a locking-pin 6, which is provided at its inner end with a head 7, which is adapted to alternately engage longitudinal grooves 8, disposed at intervals around the periphery of the threaded portion of the bolt 1, the object being that when the nut has been turned a proper distance upon the bolt 1 the locking-pin 6 is directed inwardly until the head 7 engages one of the grooves 8 in the bolt, thereby securely holding the nut in position upon the bolt and preventing rotation thereof.

The head 7 of the locking-pin 6 is held into engagement with the grooves in the bolt by means of a spring-arm 9, the free end of which is provided with a keeper 10, said keeper being adapted to engage a shoulder 11, formed in one wall of the slot 5. The opposite end of the spring-arm 9 is secured to the head 7 by means of a pin 12, which is directed through an auxiliary head 13 on the spring-arm and through the head 7 of the locking-pin, the auxiliary head being held against rotation upon the pin 12 by means of a tongue 14 at the lower edge of the auxiliary head entering a channel 15 in the head 7. The spring 9 is so constructed that it directs lateral pressure at all times upon the keeper 10, thereby insuring that the keeper will be normally disposed into engagement with the shoulder 11 when the locking-pin 6 is directed inwardly to its fullest extent.

The upper end of the keeper 10 is of sufficient length to project above the outer surface of the nut 3, so that said projecting end may be grasped and the keeper readily moved from engagement with the shoulder 11, in which event the locking-pin 6 may be readily moved longitudinally in the bore 4 and the head 7 disengaged from the grooves 8, while the lower end of the keeper 10 is disposed across the end of the locking-pin 6, thereby relieving the spring-arm of any strain from backward pressure upon said locking-pin. After the locking-pin has been properly disposed within the bore 4 the metal at the outer end of the slot 5 is directed inwardly in any preferred manner, as by striking the metal at the end of the slot with a hammer or chisel, the inwardly-directed portion of the metal forming a lug 16, which rests in the path of the auxiliary head 13, so that the locking-pin cannot be casually removed from its bore and become lost. The auxiliary head 13 is of sufficient size to snugly fit within the slot 5, thereby preventing rotation of the locking-pin 6 and holding the head 7 in such position that it will always enter the grooves 8.

In operation the nut is placed upon the bolt and turned to the desired point thereon, after which the locking-pin 6 is directed inwardly until the head 7 engages one of the grooves 8 in the bolt, and as soon as the head is firmly seated within the groove the spring-arm 9 will direct the keeper 10 into engagement with the shoulder 11, thereby firmly holding the nut in position upon the bolt and until such time as it is desired to remove the nut, in which event pressure is directed against the projecting end of the keeper 10, thereby disengaging the same from the shoulder 11, when the locking-pin 6 may be directed longitudinally in the bore 4 and the head 7 disengaged from the grooves 8, thereby leaving the nut free to be turned from off the bolt, and the locking-pin 6 is prevented from being casually removed from the bore by the auxiliary head 13, engaging the lug 16, formed by projecting a portion of the metal forming one wall of the slot 5 inwardly. It will be seen also that by directing the keeper 10 across the end of the locking-pin when the keeper is in engagement with the shoulder 11 the spring-arm 9 is relieved from any backward pressure upon the locking-pin.

What we claim is—

1. A nut-lock of the class described comprising the combination with a bolt, having one of its ends threaded and provided with a plurality of longitudinally-disposed grooves; of a nut adapted to engage the threaded end of said bolt and having a bore therein and a slot at the upper edge of the bore, a locking-pin in said bore, a head at the inner end of said locking-pin adapted to engage said grooves, a spring-arm rigidly secured to said head and means at the free end of said spring-arm adapted to engage a shoulder in one wall of said slot to lock the pin in said grooves and means to prevent the casual removal of the locking-pin from the bore.

2. A nut-lock of the class described comprising the combination with a nut having a bore therein and a slot at one edge of said bore; of a locking-pin adapted to be disposed in said bore, a head at the inner end of said locking-pin, an auxiliary head secured to said head and adapted to rest in said slot, a spring-arm secured to said auxiliary head, a keeper at the free end of said auxiliary arm adapted to normally engage a shoulder formed in one wall of said slot, one end of said keeper being disposed over the end of said locking-pin and the opposite end thereof directed beyond the base of the nut, and a lug at one end of said slot adapted to engage said auxiliary head and prevent the casual removal of the locking-pin.

3. In a nut-lock, a locking-pin having a head at one end thereof, an auxiliary head, a tongue on said auxiliary head adapted to engage a channel in said first-mentioned head, a pin directed through said head and auxiliary head, a spring-arm extending from said auxiliary head and a keeper on the free end of said spring-arm, one end of which is disposed over one end of the locking-pin and the opposite end thereof extending above said spring-arm.

4. A nut-lock of the class described comprising the combination with a nut having a bore therein and a slot at one edge of said bore; of a locking-pin in said bore, a head at one end of said locking-pin, an auxiliary head, a tongue on said auxiliary head adapted to enter a channel in said first-mentioned head and prevent rotation of the auxiliary head, a pin disposed through said head and auxiliary head, a spring-arm secured to said auxiliary head and means at the outer end thereof to engage a shoulder in the wall of said slot and normally lock said locking-pin in its adjusted position, and additional means to prevent casual removal of the locking-pin from the bore.

In testimony whereof we have signed our names to this specification in the presence of two subscribing witnesses.

JOHN H. MAGILL.
HENRY H. POLSON.

Witnesses:
GEO. H. TRINKLE,
JOHN E. MARTIN.